(12) United States Patent
Hachkowski et al.

(10) Patent No.: US 6,972,901 B2
(45) Date of Patent: Dec. 6, 2005

(54) SYSTEM FOR DEPLOYING THE PETALS OF A SECTORED MIRROR OF AN OPTICAL SPACE TELESCOPE

(75) Inventors: M. Roman Hachkowski, Ridgefield, CT (US); Charles D. Cox, Sandy Hook, CT (US)

(73) Assignee: Goodrich Corporation, Charlotte, NC (US)

( * ) Notice: Subject to any disclaimer, the term of this patent is extended or adjusted under 35 U.S.C. 154(b) by 5 days.

(21) Appl. No.: 10/869,517

(22) Filed: Jun. 16, 2004

(65) Prior Publication Data

US 2004/0246577 A1 Dec. 9, 2004

Related U.S. Application Data

(62) Division of application No. 10/216,255, filed on Aug. 9, 2002, now Pat. No. 6,768,582.

(51) Int. Cl.$^7$ .............................................. G02B 23/00
(52) U.S. Cl. ...................................... 359/399; 244/173
(58) Field of Search ................................ 359/399, 872, 359/877; 244/173; 16/229, 231, 276

(56) References Cited

U.S. PATENT DOCUMENTS

| | | | | |
|---|---|---|---|---|
| 5,785,280 A | * | 7/1998 | Baghdasarian | 244/173 |
| 5,898,529 A | * | 4/1999 | Meyer et al. | 359/853 |
| 6,505,381 B1 | * | 1/2003 | Thomson et al. | 16/302 |
| 6,767,155 B2 | * | 7/2004 | O'Brien et al. | 403/322.1 |

OTHER PUBLICATIONS

Carrier et al, Development and Demonstration of a Precision Latch for Deployable Optical Systems, Preceedings of SPIE vol. 4850, 2003.*

* cited by examiner

Primary Examiner—Mark A. Robinson
(74) Attorney, Agent, or Firm—Scott D. Wofsy; Edwards & Angell, LLP

(57) ABSTRACT

A system is disclosed for deploying the petals of a sectored mirror assembly of an optical space telescope, wherein the sectored mirror includes a central hub and a plurality of petals disposed about the periphery of the central hub, and each petal has a petal root independently hinged to the central hub. The system includes a first hinge assembly having a root mount secured to a petal root and a hub mount secured the central hub, whereby the first hinge assembly affords the petal associated therewith freedom of rotation about a petal hinge axis. The system further includes a second hinge assembly including a root mount secured to the petal root and a hub mount secured to the central hub, whereby the second hinge assembly affords the petal associated therewith freedom of rotation about the petal hinge axis and freedom to expand and contract thermally, and move rigidly along the petal hinge axis in a frictionless, unconstrained manner. The system also includes a latch assembly including a clevis secured to the petal root at a location spaced from the hinge axis and a pair of laterally opposed latch mechanism operatively associated with the central hub for engaging the clevis upon rotation of the petal about the hinge axis from a stowed position to a deployed position.

21 Claims, 8 Drawing Sheets

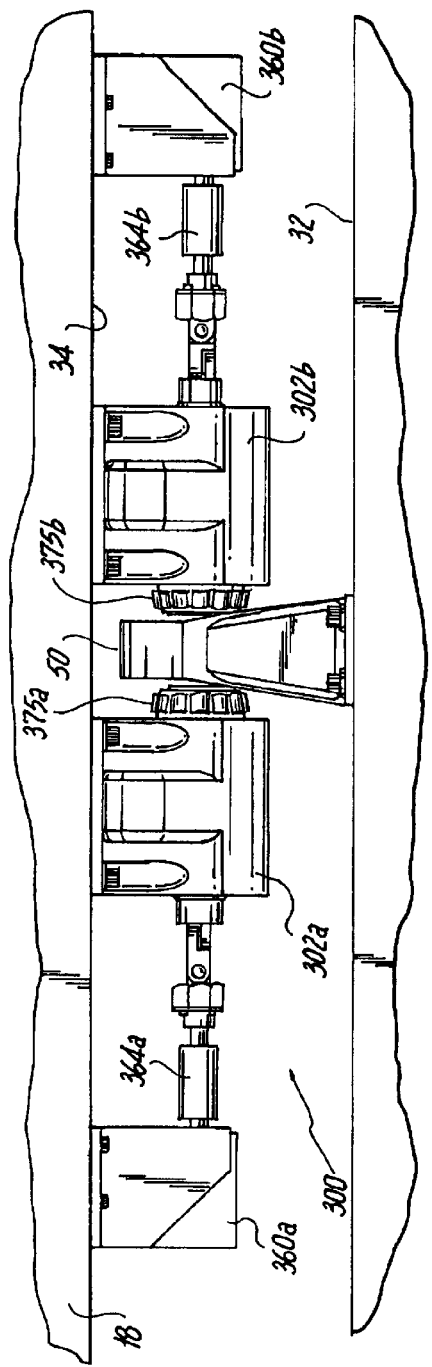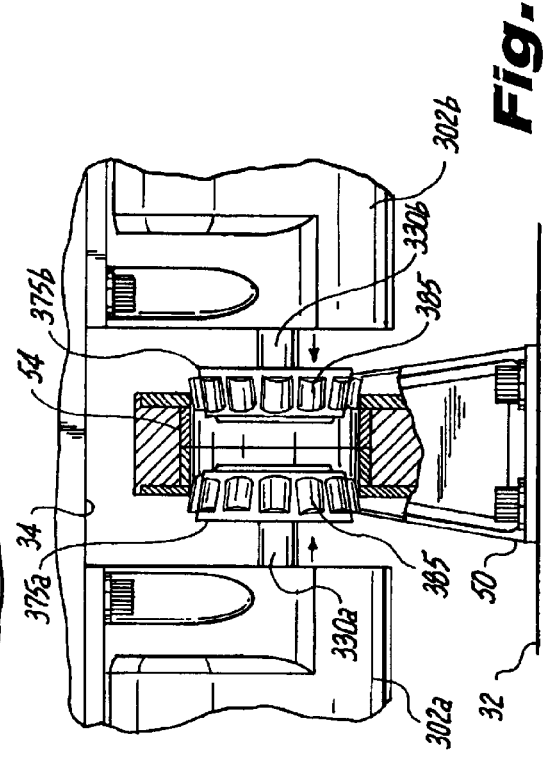

SYSTEM FOR DEPLOYING THE PETALS OF A SECTORED MIRROR OF AN OPTICAL SPACE TELESCOPE

CROSS-REFERENCE TO RELATED APPLICATION

The subject application is a divisional application of U.S. patent Application Ser. No. 10/216,255 filed Aug. 9, 2002 now U.S. Pat. No. 6,768,582.

BACKGROUND OF THE INVENTION

1. Field of the Invention

The subject invention relates to a system for deploying the petals of a sectored mirror of an optical space telescope, and more particularly, to a set of hinges for independently connecting a petal of the sectored mirror to the central hub of the sectored mirror and to a latch mechanism for securing the hinged petal to the central hub in a deployed position.

2. Background of the Related Art

The success of the Hubble Space Telescope has spurred the development of other space-based astronomical observatories, including some incorporating a large diameter primary mirror. A number of designs, including the space-based observatory known as the Next Generation Space Telescope (NGST), have centered on a primary optic that is between six and eight meters in diameter.

Several problems must be overcome to realize a space-based astronomical observatory having such a large diameter mirror. For example, designs that propose a large diameter monolithic mirror would present significant manufacturing difficulties and risks. In addition, the size and shape of an observatory having a large diameter mirror would be constrained by the volume and shape of payload or cargo bays available on current launch vehicles.

Designs that propose a deployable large diameter mirror present other problems. For example, to achieve a desired surface accuracy and optical quality, the reflective components (e.g., sectors, segments or petals) of the mirror must be aligned to a very high degree of precision, such as, within about 10 nanometers. In addition, because the spacebased observatory would experience broad thermal gradients, the thermal expansion and contraction of the deployable reflective components would need to be accommodated.

It would be beneficial therefore, to provide a deployment system for the reflective components of an optical space telescope that exhibits a high degree of precision and accommodates thermal changes experienced in an operational environment.

SUMMARY OF THE INVENTION

The subject invention is directed to a new and useful system for deploying the petals of a sectored mirror assembly of an optical space telescope. The mirror assembly includes a central hub and a plurality of petals disposed about the periphery of the central hub. Each petal has a petal root that is independently hinged to the central hub of the mirror assembly.

The petal deployment system of the subject invention includes a first hinge assembly having a root mount secured to a petal root and a hub mount secured the central hub. The first hinge assembly is adapted and configured to afford the petal associated therewith freedom of rotation about a petal hinge axis.

The petal deployment system further includes a second hinge assembly having a root mount secured to the petal root and a hub mount secured to the central hub. The second hinge assembly is adapted and configured to afford the petal associated therewith freedom of rotation about the petal hinge axis, as well as freedom to expand and contract thermally, and move rigidly along the petal hinge axis in a frictionless, unconstrained manner.

The petal deployment system further includes a latch assembly including a clevis secured to the petal root at a location spaced from the hinge axis and a pair of laterally opposed latches that are operatively associated with the central hub for engaging the clevis upon rotation of the petal about the hinge axis from a stowed position to a deployed position.

Preferably, the first hinge assembly includes a first hinge shaft disposed on the petal hinge axis. The first hinge shaft is secured to the root mount of the first hinge assembly, and supports a plurality of axially spaced apart angular contact bearings. The angular contact bearings are formed from silicon nitride, do not require lubrication and are housed within the hub mount of the first hinge assembly.

Preferably, the second hinge assembly includes a second hinge shaft disposed on the petal hinge axis. The second hinge shaft is supported by the root mount of the second hinge assembly, and is disposed within a cylindrical bearing cage. The bearing cage is formed from PTFE and retains a plurality of ball bearings. The ball bearings are formed from silicon nitride and do not require lubrication. The bearing cage is disposed between an inner bearing race and an outer bearing race, and is housed within the hub mount of the second hinge assembly.

Preferably, the latch assembly of the subject invention is adapted and configured to afford the petal associated therewith freedom to expand and contract thermally, and move rigidly along a latch axis extending parallel to the hinge axis in a frictionless, unconstrained manner. Each laterally opposed latch of the latch assembly includes a latch shaft mounted for linear movement along the latch axis. The clevis of the latch assembly defines a reception aperture for receiving the laterally opposed latch shafts, and an actuator is operatively associated with each latch for moving the latch shaft thereof into engagement with the clevis.

Each latch shaft is disposed within a cylindrical bearing cage, and each bearing cage is formed from PTFE. Each bearing cage retains a plurality of ball bearings formed from silicon nitride, and is disposed between an inner bearing race and an outer bearing race. Each bearing cage is housed within a hub mount secured to the central hub, and each hub mount includes a base portion and a cylindrical housing portion.

These and other unique features of the petal deployment system of the subject invention will become more readily apparent from the following description of the drawings taken in conjunction with the description of the preferred embodiment.

BRIEF DESCRIPTION OF THE DRAWINGS

So that those having ordinary skill in the art to which the subject invention appertains will more readily understand how to construct and use the petal deployment system of the subject invention, reference may be had to the drawings wherein:

FIG. 8 is an inverted side elevational view of the double throw latch assembly of the subject invention in an unlatched position with the opposed latch shafts disengaged from the clevis disposed therebetween; and FIG. 9 is an enlarged, localized and inverted side elevational view of the double throw latch assembly of the subject invention in a latched position with the opposed latch shafts in engaged with the clevis disposed therebetween.

DESCRIPTION OF THE PREFERRED EMBODIMENTS

Figure 1:
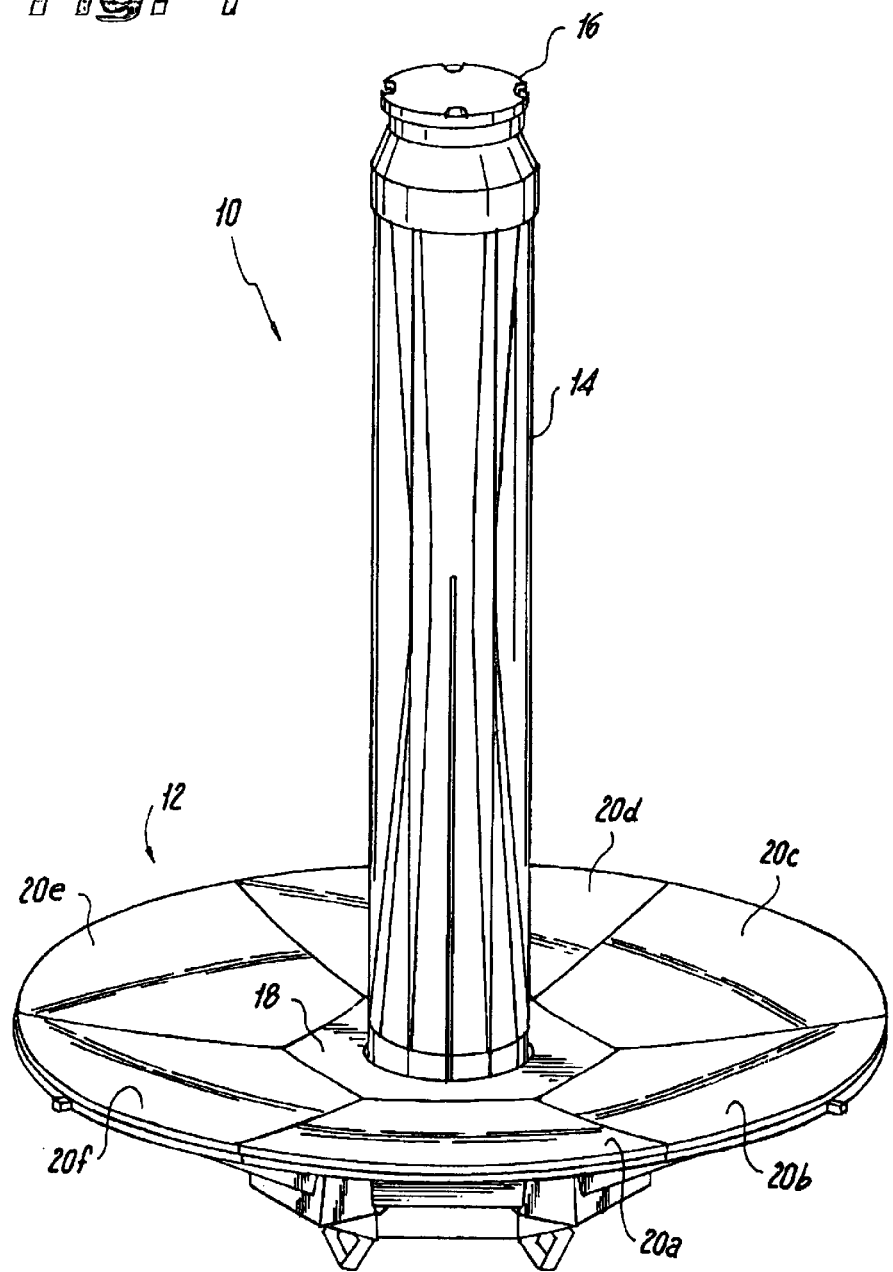
FIG. 1 is a perspective view of an optical space telescope having a primary mirror assembly that includes a hexagonal central hub portion and six petals with reflective surfaces independently hinged to the central hub portion, with each of the six petals disposed in a deployed position.

Referring now to the drawings wherein like reference numerals identify similar structural features of the petal deployment system of the subject invention, there is illustrated in FIG. 1 an optical space telescope designated generally by reference numeral 10. Optical space telescope 10 includes a primary mirror assembly 12 (shown here in a deployed position), a tower 14 that extends from the center of the primary mirror assembly 12, and a secondary mirror 16 which is mounted atop the central tower 14. The primary mirror assembly or optic 12 consists of a hexagonal central hub portion 18 and six petals 20a–20f that are independently hinged to the central hub portion 18.

Figure 2:
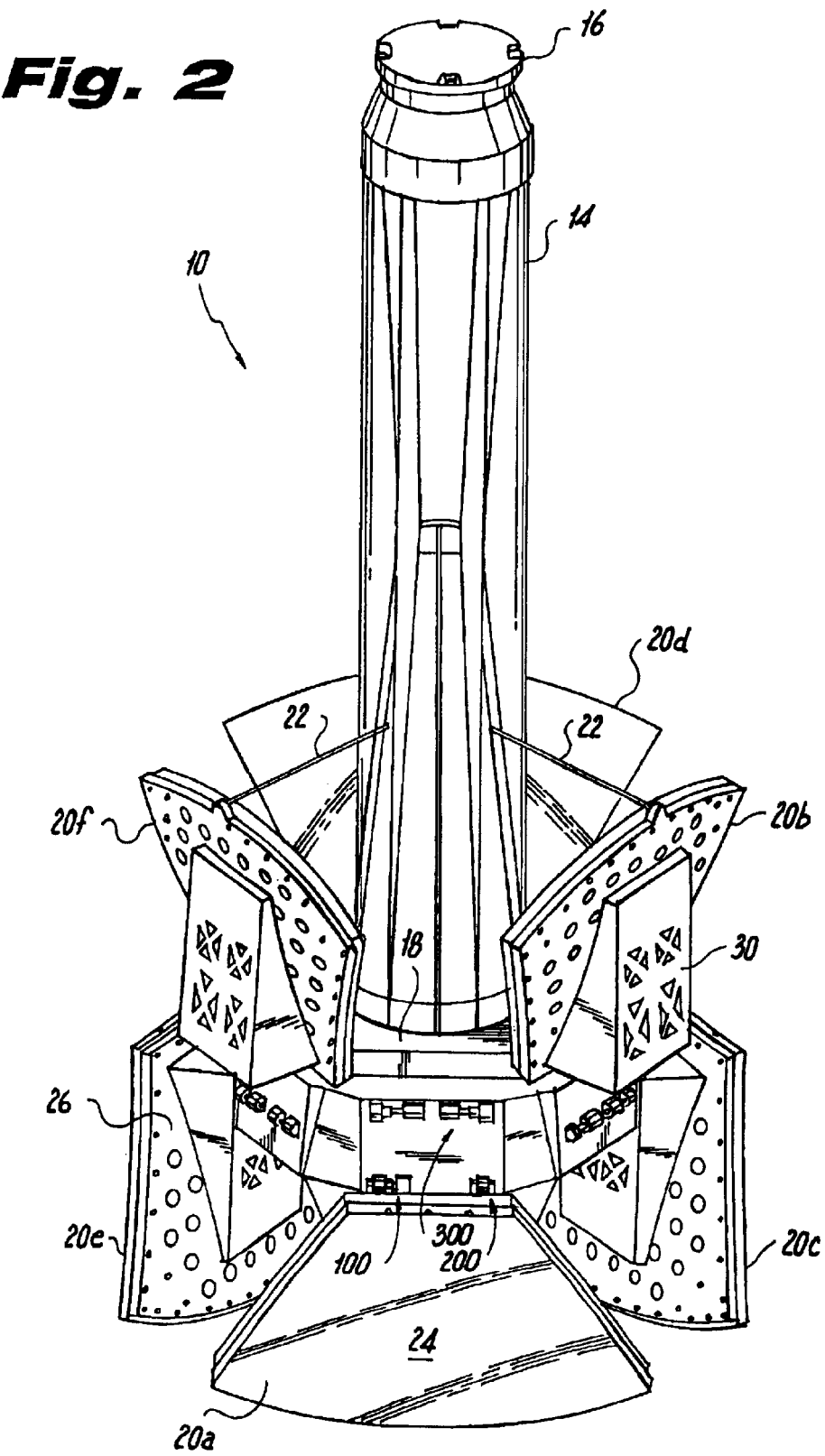
FIG. 2 is a perspective view of the optical space telescope of FIG. 1, wherein three of the petals are hingedly mounted to the central hub portion and stowed in an aft position and three of the petals are hingedly mounted to the central hub portion and stowed in a forward position.

As illustrated in FIG. 2, three of the petals 20a, 20c and 20e are hingedly mounted for stowage in an aft position and three of the petals 20b, 20d and 20f are mounted for stowage in a forward position. Each petal 20a–20f has a launch latch strut 22 associated therewith that secures the petal in a stowed position. Each petal 20a–20f has a figure-controlled reflective surface 24 that is formed from fused silica facesheets and a housing 26 formed from a light-weight carbon composite material. The shape of the reflective surface 24 of each petal 20a–20f is controlled by a plurality of figure control actuators (not shown) positioned within the petal housing 26.

The radially inward end of each petal housing 26 forms a triangular petal root structure 30 that supports a pair of hinge assemblies 100, 200 which are discussed in greater detail hereinbelow. Each of the petals 20a–20f is operatively connected to the central hub portion 18 of primary mirror assembly 12 by two hinge assemblies 100, 200 (see FIG. 4). The petal root structure 30 also supports a clevis 50 that forms part of a latch assembly 300 operatively associated with the central hub portion 18 for engaging the clevis 50 upon movement of a petal from the stowed position of FIG. 2 to the deployed position of FIG. 1.

Figure 3:
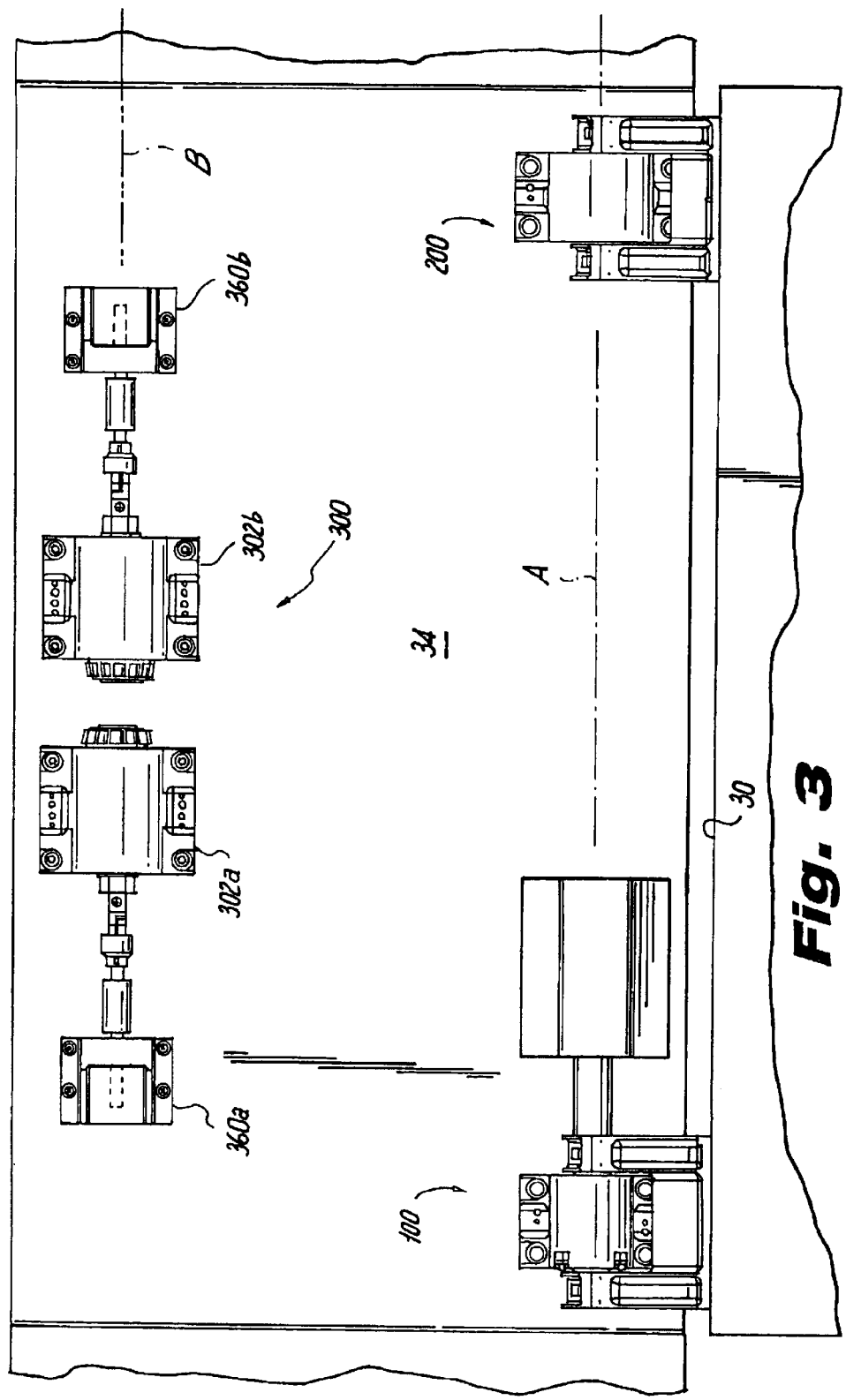
FIG. 3 is a side elevational view of a petal mounting section of the central hub portion of the optical space mirror of FIGS. 1 and 2, as viewed along the mounting surface of the petal root structure, illustrating in top plan view the double throw latch assembly of the subject invention which is mounted on the central hub portion, and illustrating in side elevational view the two unique hinge assemblies of the subject invention which are mounted to the petal root structure and the central hub portion.

Referring to FIG. 3, each paired set of hinges assemblies 100 and 200 define a common hinge line or axis A about which the petal associated therewith rotates, and along which thermal expansion and contraction, as well as rigid movement of the petal structure is accommodated. The latch assembly 300 defines a latch line or axis B that is spaced from and parallel to the hinge axis A. The latch assembly 300 is adapted and configured to accommodate thermal expansion and contraction, as well as rigid axial movement of the petal structure along latch axis B.

The One Degree of Freedom Hinge Assembly

Figure 4:
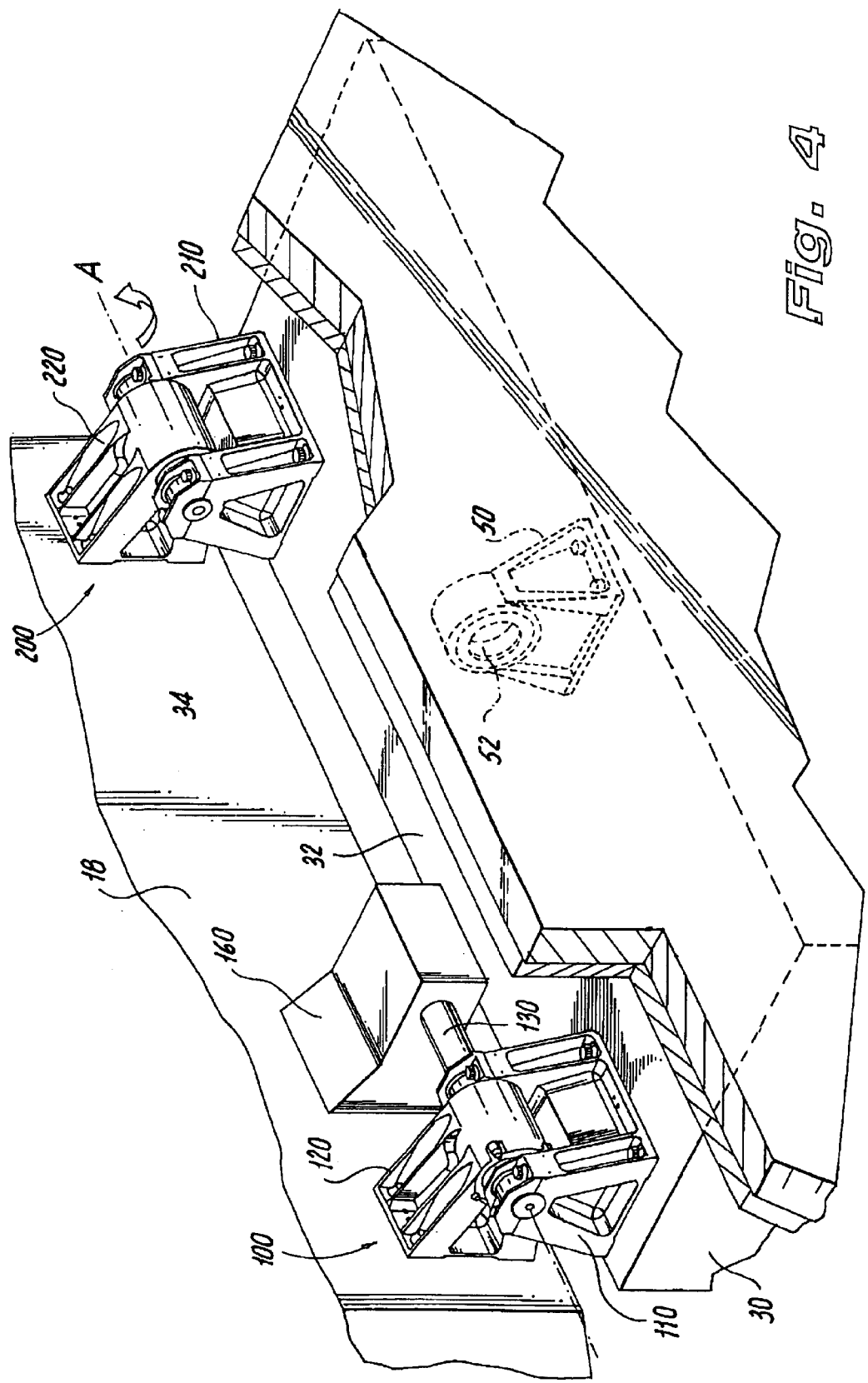
FIG. 4 is a perspective view of the interface region between the petal root structure and the central hub portion of the optical space mirror of FIGS. 1 and 2, illustrating the two hinge assemblies of the subject invention, and the clevis associated with the latch assembly, which is shown in phantom lines and mounted to the petal root structure.
Figure 5:
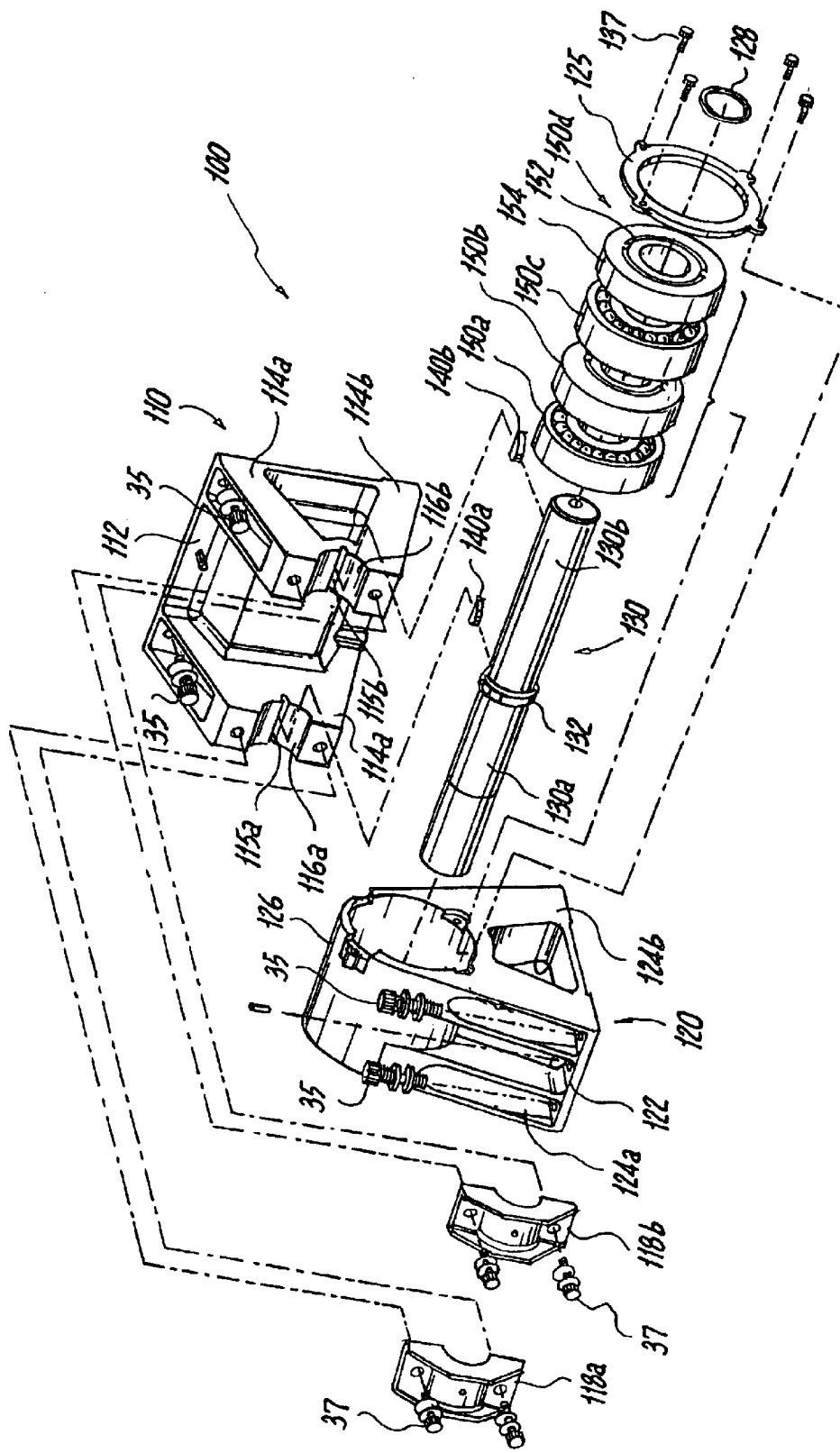
FIG. 5 is an exploded perspective view of the one degree-of-freedom hinge assembly of the subject invention which includes a root mount secured to the petal root and a hub mount secured to the central hub portion of the optical space telescope of FIGS. 1 and 2.

Referring to FIGS. 3 through 5, hinge assembly 100 is a one degree of freedom hinge assembly (1DOF) in that it is adapted and configured to afford the petal associated therewith freedom of rotation about the petal hinge axis. Hinge assembly 100 includes a root mount 110 secured to the mounting surface 32 of the root structure 30 of a petal 20, and a hub mount 120 secured a mounting surface 34 of the central hub portion 18 of primary mirror assembly 12.

The root mount 110 is defined by a base 112 and pair of upstanding trusses 114a and 114b. The base 112 is secured to the mounting structure 32 of the petal root structure 30 by a plurality of fasteners 35. The trusses 114a and 114b have respective hemi-cylindrical channels 116a and 116b for accommodating an axial hinge shaft 130. Channels 116a and 116b are further defined and enclosed by corresponding channeled root mount caps 118a and 118b that are secured to the trusses 114a and 114b, respectively, by fasteners 37.

Hinge shaft 130 is secured to the root mount 110 of hinge assembly 100 by a pair of axially spaced apart woodruff keys 140a and 140b. More particularly, woodruff keys 140a and 140b are seated in corresponding slots 115a and 115b that are respectively formed in the channels 116a and 116b of trusses 114a and 114b. The two keys 140a and 140b are positioned to engage complementary slots (not shown) that are formed in hinge shaft 130 to secure the orientation of the shaft 130 with respect to the root mount 110.

Hinge shaft 130 is divided into two sections 130a, 130b separated by an annular collar 132. The first shaft portion 130a of hinge shaft 130 extends laterally from hinge assembly 100 and is supported within a stabilizing block 160 is fixedly secured to the mounting surface 34 of hub portion 18, as best seen in FIG. 4. The second shaft portion 130b supports four axially spaced apart angular contact bearings 150a–150e which are axially aligned and retained between the annular collar 132 and a retaining collar 128. The angular contact bearings 150a–150d are preferably formed from silicon nitride, and do not require lubrication. Each angular contact bearing 150a–150d has relatively movable inner and outer races 152 and 154. The inner race 152 of each bearing is tightly fit onto the first shaft portion 130b of hinge shaft 130.

The hub mount 120 of hinge assembly 100 is defined by a base 122 and a pair of upstanding trusses 124a and 124b. The base 122 is secured to the mounting structure 32 of the petal root structure 30 by a plurality of fasteners 35. The trusses 124 and 124b transition into a cylindrical housing 126. The outer race 154 of each of the angular contact bearings 150a–150d is tightly fit within the cylindrical housing 126 of hub mount 120. The four contact bearings are enclosed within the cylindrical housing 126 by a retainer ring 125 that is secured to the end of the housing 126 by plurality of threaded fasteners 137.

In operation, when a petal 20a–20f of primary mirror assembly 12 is moved from the stowed position of FIG. 2 to the deployed position of FIG. 1, the relatively movable inner and outer races 152 and 154 of each angular contact bearing 150a–150d affords rotational movement of the root mount 110 relative to the hub mount 120 along the axis of the hinge shaft 130. Hinge assembly 100 constrains all other movement relative to the hinge axis.

The Two Degree of Freedom Hinge Assembly

Figure 6:
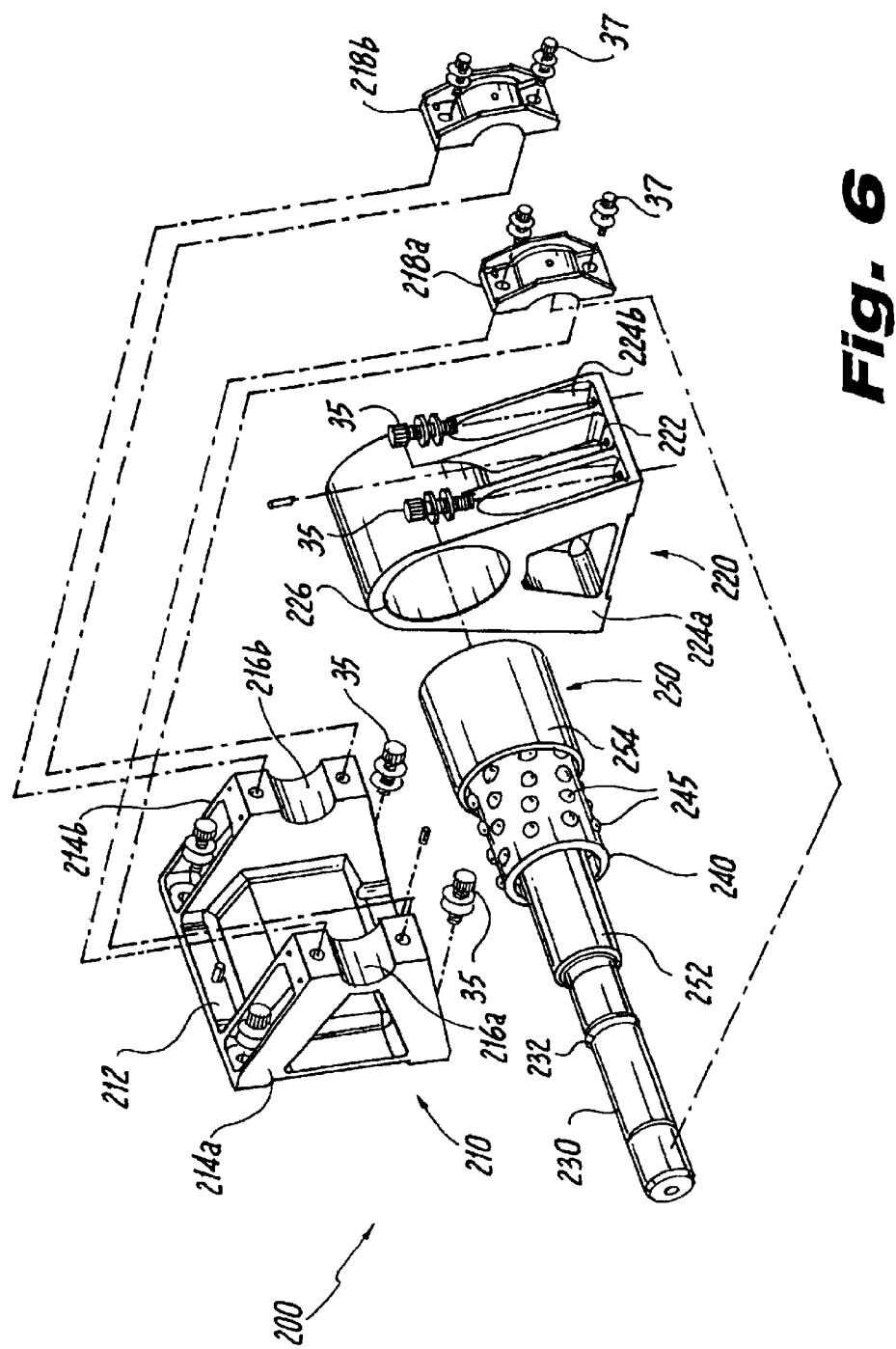
FIG. 6 is an exploded perspective view the two degree of freedom hinge assembly of the subject invention which includes a root mount secured to the petal root and a hub mount secured to the central hub portion of the optical space telescope of FIGS. 1 and 2.

Referring to FIGS. 3, 4 and 6, hinge assembly 200 is a two degree-of-freedom hinge assembly (2DOF) in that it adapted and configured to afford the petal associated therewith freedom of rotation about the petal hinge axis, as well as freedom to expand and contract thermally, and move rigidly along the petal hinge axis in a frictionless, unconstrained manner. Hinge assembly 200 includes a root mount 210 secured to the mounting surface 32 of the root structure 30 of a petal 20, and a hub mount 220 secured to the mounting surface 34 the central hub portion 18 of the primary mirror assembly 12. The root mount 210 is defined by a base 212 and pair of upstanding trusses 214a and 214b. The base 112 is secured to the mounting structure 32 of the petal root structure 30 by a plurality of fasteners 35. The trusses 214a and 214b have respective hemi-cylindrical channels 216a and 216b for accommodating an axial hinge shaft 230. Channels 216a and 216b are further defined and enclosed by corresponding channeled root mount caps 218a and 218b that are secured to the trusses 214a and 214b, respectively, by fasteners 37.

Hinge shaft 230 is supported by the root mount 210, and more particularly is seated within the channels formed by trusses 214a, 214b and root mount caps 218a, 218b. A unique bearing assembly 250, that enables hinge assembly 200 to provide two degrees of freedom, is operatively associated with hinge shaft 230. Bearing assembly 250 includes a cylindrical bearing cage 240 that is preferably formed from PTFE, and retains a plurality of ball bearings 245 formed from silicon nitride. The ball bearings 245 are arranged in a splined pattern. Bearing assembly 250 further includes a cylindrical inner bearing race 252 and a cylindrical outer bearing race 254. The inner bearing race 252 is intimately engaged with hinge shaft 230, retained by the annular shaft collar 232. Similarly, the outer bearing race 254 is intimately engaged with hub mount 220.

The hub mount 220 of hinge assembly 100 is defined by a base 222 and a pair of upstanding trusses 224a and 224b. The base 222 is secured to the mounting structure 32 of the petal root structure 30 by a plurality of fasteners 35. The trusses 224 and 224b transition into a cylindrical housing 226. The outer cylindrical race 254 of bearing assembly 250 is accommodated within the cylindrical housing 226 of hub mount 220.

In operation, when a petal 20 of primary mirror assembly 12 is moved from the stowed position of FIG. 2 to the deployed position of FIG. 1, the relatively movable inner and outer races 252 and 254 of bearing assembly 250 afford rotational and linear movement of the root mount 210 relative to the hub mount 220 along the axis of the hinge shaft 230. Consequently, thermal expansion and contraction of the petal root structure will be accommodated, along with rigid movement of the root structure along the petal hinge axis A in a frictionless, unconstrained manner. Hinge assembly 200 constrains all other movement relative to the hinge axis.

The Double Throw Latch Assembly

Referring now to FIGS. 3, 4 and 7 through 9, latch assembly 300 is a double throw latch assembly that is extremely stable in that it exhibits high stiffness and low hysterisis when subjected to operational loads experienced during deployment. Latch assembly 300 is adapted and configured to afford the petal associated therewith freedom to expand and contract thermally, and move rigidly along the latch axis B. More specifically, latch assembly 300 is designed to constrain four degrees-of-freedom and allow unconstrained motion relative to the hinge axis A in two degrees-of-freedom. That is, the latch assembly 300 constrains the petal rotational degree-of-freedom about the hinge axis A, as well as the lateral degree-of-freedom and two rotational degrees-of-freedom about the hinge axis A.

The latch assembly 300 includes the clevis 50 secured to the mounting surface 32 of petal root structure 30 and which defines a reception aperture 52 (see FIG. 4). Latch assembly 300 further includes a pair of laterally opposed latches 302a and 302b which are operatively associated with the mounting surface 34 of the central hub portion 18 of primary mirror assembly 12 for engaging the reception aperture 52 of the clevis 50 upon movement of a petal from the stowed position of FIG. 2 to the deployed position of FIG. 1.

Figure 7:
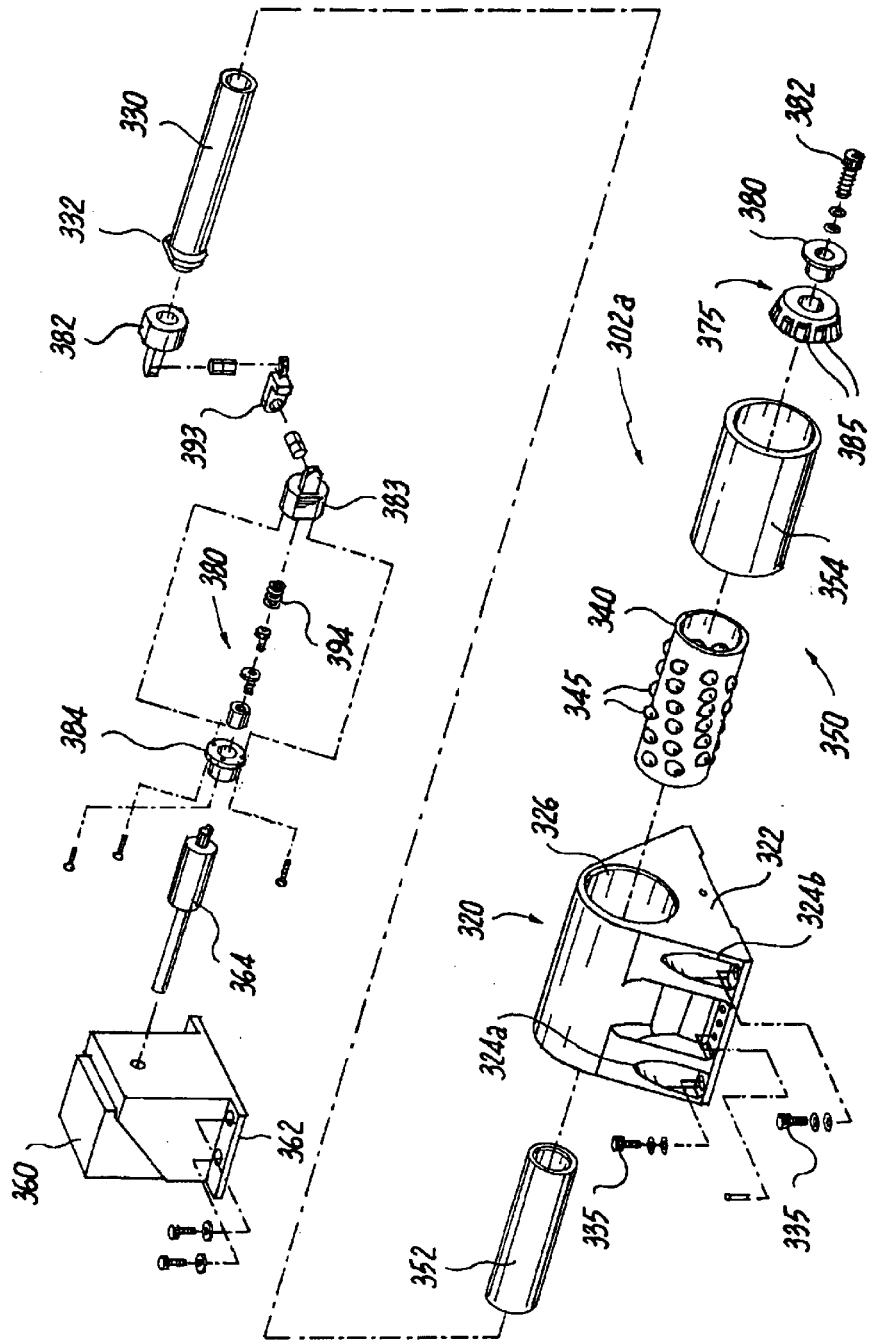
FIG. 7 is an exploded perspective view of a latch mechanism of the double throw latch assembly of the subject invention which includes an axially advanceable latch shaft configured to engage the clevis on the petal root structure shown in FIG. 4 upon rotation of the petal about the hinge axis from the stowed position of FIG. 2 to the deployed position of FIG. 1.

Referring to FIG. 7, the laterally opposed latches 302a, 302b are identical in construction and function. Each latch includes a latch shaft 330 mounted for linear movement along latch axis B. An actuator 360 disposed within a housing 362 fastened to the mounting surface 34 of central hub portion 18 is coupled to the end of each latch shaft 330 by way of a linkage assembly 380. The actuator 360 is adapted and configured to facilitate axial advancement of the latch shaft 330 relative to the reception aperture 52 of clevis 50. Linkage assembly 380 includes a fore link 382 fastened to the end of latch shaft 330, a primary medial link 383 and an aft coupling 384 operatively associated with the actuator drive shaft 364. Medial link 383 is associated with aft coupling 384 through a biasing member 394, and to fore link 383 through a pivot member 393.

Each latch shaft 330 is operatively associated with a bearing assembly 350 that includes a cylindrical bearing cage 340 that is formed from PTFE and configured to retain a plurality of ball bearings 345 formed from silicon nitride. The ball bearings 345 are seated in respective apertures and are arranged in a spline pattern. Each bearing cage 340 is disposed between a cylindrical inner bearing race 352 and a cylindrical outer bearing race 354. The inner bearing race 352 is intimately engaged with latch shaft 330, retained in part by annular shaft collar 332. The outer bearing race 354 is supported in a hub mount 320.

Hub mount 320 includes a base 322 having upstanding trusses 324a and 324b fastened to the mounting surface 34 of the central hub portion 18 by a plurality of fasteners 335. The trusses 324a, 324b transition into a cylindrical housing 326. The outer cylindrical bearing race 354 is accommodated within the cylindrical housing 326 of hub mount 320.

The relatively movable inner and outer races 352 and 354 of bearing assembly 350 afford rotational and linear movement of the root mount 310 relative to clevis 50 along the axis of the hinge shaft 330 when the petal is in the deployed and latched position. Consequently, thermal expansion and contraction of the petal root structure will be accommodated by the latch assemblies 300, along with rigid movement of the root structure along the hinge axis in a frictionless, unconstrained manner relative to the latch axis B.

With continuing reference to FIG. 7, a tapered bearing 375 is mounted to the free end of latch shaft 330 by a support hub 380 and secured by a fastener 382. Tapered bearing 375 carries a plurality of cylindrical rollers 385 adapted and configured to engage the reception aperture 52 of clevis 50, as discussed in more detail hereinbelow.

When petals 20a–20f of mirror assembly 12 are independently rotated into the deployed positions shown in FIG. 1, the opposed latches 302a, 302b of latch assembly 300 slide past the clevis 50 without making contact therewith. In the deployed position, the reception aperture 52 of the clevis 50 on each petal root 30 is aligned with the latch axis B defined by the opposed latch shafts 330a, 330b of latches 302a, 302b, as best seen in FIG. 8. At such a time, the tapered bearings 375a, 375b on the end of latch shafts 330a, 330b are spaced from the clevis 50. At the appropriate instance, the respective drive shafts 364a, 364b of actuators 360a, 360b, which are coupled to latch shafts 330a, 330b respectively, are actuated, preferably simultaneously. This, in turn, causes the tapered bearings 375a, 375b to translate axially into engagement with the reception bore 52 of clevis 50, as best seen in FIG. 9.

Upon engagement, the rollers 385 within the tapered bearings 375a, 375b on the end of each latch shaft 330, 330b contact a reception bore liner 54 secured within the reception bore 52 of clevis 50. During this engagement, no latching forces are created in the petal root structure. The distance through which the latch shafts 330a, 330b travel to engage the reception bore 52 of the clevis 50 is relatively small compared to their overall length. This ensures that the bearing cage 340 with which each latch shaft 330a, 330b is associated does not become displaced from its housing defined by hub mount 320.

The mating forces exerted by the opposed latches 302a, 302b on the clevis 50 are equal and opposite, thus ensuring that a moment will not be applied to the clevis 50 during engagement. This results in the low hysterisis and high stiffness exhibited by the latch assembly 300 of the subject invention. Specifically, the double throw latch assembly 300 of the subject invention exhibits axial stiffness on the order of 1,000,000 lbs/in. Consequently, when the opposed latches 302a, 302b are engaged, as shown in FIG. 9, the clevis 50 will not rotate and re-seat with the rollers 385 in the bearing 375a, 375b on the end of each latch shaft 330a, 330b.

Although the subject invention has been described with respect to preferred embodiments, those skilled in the art will readily appreciate that modifications and changes may be made thereto without departing from the spirit or scope of the subject invention as defined by the appended claims. Moreover, while the hinge and latch assemblies disclosed herein have been described and illustrated with respect to a optical space telescope such as the NGST, it is envisioned that these mechanism may be employed in other space based optical systems.

What is claimed is:

1. A petal deployment latch assembly for securing a petal of a sectored mirror of an optical space telescope to the central hub of the sectored mirror, the latch assembly comprising:

a) a clevis secured to a root of a petal and defining a reception aperture; and b) a pair of laterally opposed latches operatively associated with the central hub for engaging the reception aperture of the clevis upon movement of the petal from a stowed position to a deployed position, each of the opposed latches having a bearing mounted to a free end thereof which engages the reception aperture of the clevis.

2. A petal deployment latch assembly as recited in claim 1, wherein each laterally opposed latch includes a latch shaft mounted for linear movement along a latch axis.

3. A petal deployment latch assembly as recited in claim 2, wherein an actuator is operatively associated with each latch for moving the latch shaft thereof into engagement with the clevis.

4. A petal deployment latch assembly as recited in claim 2, wherein each latch shaft is disposed within a cylindrical bearing cage.

5. A petal deployment latch assembly as recited in claim 4, wherein each cylindrical bearing cage is formed from PTFE.

6. A petal deployment latch assembly as recited in claim 5, wherein each cylindrical bearing cage retains a plurality of ball bearings.

7. A petal deployment latch assembly as recited in claim 6, wherein the ball bearings are formed from silicon nitride.

8. A petal deployment latch assembly as recited in claim 7, wherein each bearing cage is disposed between an inner bearing race and an outer bearing race.

9. A petal deployment latch assembly as recited in claim 4, wherein each bearing cage is housed within a hub mount secured to the central hub.

10. A petal deployment latch assembly as recited in claim 9, wherein each hub mount includes a base portion and a cylindrical housing portion.

11. A petal deployment latch assembly as recited in claim 1, wherein the latch assembly is adapted and configured to afford the petal associated therewith freedom to expand and contract thermally, and move rigidly along the latch axis.

12. A petal deployment latch assembly as recited in claim 1, wherein each bearing is a tapered bearing carrying a plurality of cylindrical rollers.

13. A petal deployment latch assembly for securing a petal of a sectored mirror of an optical space telescope to the central hub of the sectored mirror, the latch assembly comprising:

a) a clevis secured to a root of a petal and defining a reception aperture; and b) a pair of laterally opposed latches operatively associated with the central hub for engaging the reception aperture of the clevis upon movement of the petal from a stowed position to a deployed position, each latch including:

i) a latch shaft mounted for linear movement along a latch axis;

ii) a cylindrical bearing cage surrounding the latch shaft; and iii) a hub mount secured to the central hub and housing the bearing cage in such a manner so that the petal associated with the latch assembly is afforded freedom to expand and contract thermally, and move rigidly along the latch axis in a frictionless, unconstrained manner.

14. A petal deployment latch assembly as recited in claim 13, wherein each hub mount includes a base portion and a cylindrical housing portion.

15. A petal deployment latch assembly as recited in claim 13, further comprising an actuator operatively associated with each latch for linearly moving the latch shaft thereof into engagement with the clevis.

16. A petal deployment latch assembly as recited in claim 13, wherein each bearing cage is formed from PTFE.

17. A petal deployment latch assembly as recited in claim 13, wherein each bearing cage retains a plurality of ball bearings.

18. A petal deployment latch assembly as recited in claim 17, wherein the ball bearings are formed from silicon nitride.

19. A petal deployment latch assembly as recited in claim 13, wherein each bearing cage is disposed between an inner bearing race and an outer bearing race.

20. A petal deployment latch assembly as recited in claim 13, wherein each of the opposed latches has a bearing mounted to a free end thereof which engages the reception aperture of the clevis.

21. A petal deployment latch assembly as recited in claim 20, wherein each bearing is a tapered bearing carrying a plurality of cylindrical rollers.

* * * * *